United States Patent [19]

Messer

[11] 4,311,731
[45] Jan. 19, 1982

[54] METHOD FOR MAKING SHATTER-RESISTANT MIRROR

[76] Inventor: John A. Messer, P.O. Box 648, Greer, S.C. 29651

[21] Appl. No.: 111,330

[22] Filed: Jan. 11, 1980

[51] Int. Cl.³ .................. C03C 17/32; G02B 5/08; G02B 1/10; B05D 1/38
[52] U.S. Cl. ..................................... 427/162; 427/55; 427/168
[58] Field of Search ................. 427/162, 168, 55, 314, 427/318, 389.7; 428/432

[56] References Cited

U.S. PATENT DOCUMENTS 4,161,556  7/1979  Lenard et al. .................... 427/389.7

Primary Examiner—James R. Hoffman
Attorney, Agent, or Firm—Bailey, Dority & Flint

[57] ABSTRACT

A shatter-resistant mirror article and method for making same is disclosed wherein the back side of the mirror article is spray coated with two successive layers of a rubber adhesive composition with subsequent heat treatment steps wherein the mirror and layers are dried from the back side of the mirror outwardly to eliminate moisture and mirror defects and enhance adherence and shatter resistance.

7 Claims, 4 Drawing Figures

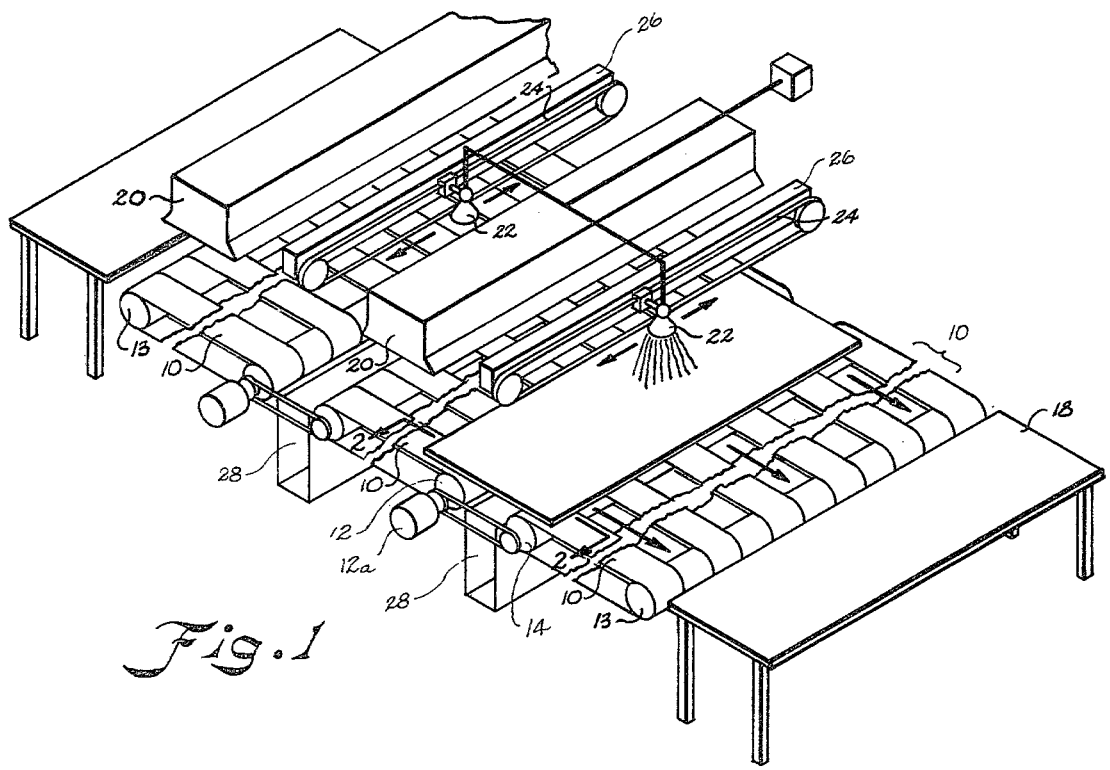
Fig.1
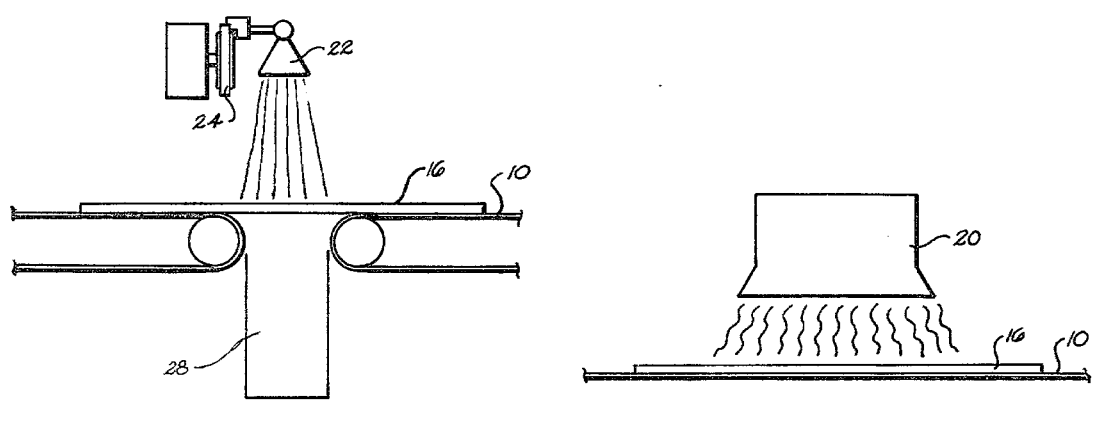
Fig.1a
Fig.1b
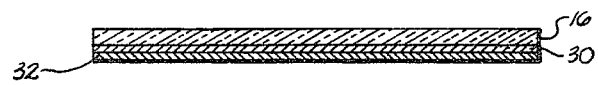
Fig.2

METHOD FOR MAKING SHATTER-RESISTANT MIRROR

BACKGROUND OF THE INVENTION

The increased use of decorative mirror products in residential and commercial buildings has been accompanied by safety performance specifications covering the breakage and shattering of mirrors and other safety glazing material used in buildings which are specified in regulation code A.N.S.I.-297-1-1975 established by the American National Standard Institute.

It has already been known to improve the resistance to shattering of glass container bottles and the like by coating them with a suitable material such as polyolefin.

A prior attempt to provide a shatter resistant glass mirror has included the application of a polyethylene sheet-like material and adhesive to the back side of the mirror to thereby hold the shattered particles together when broken. However, this is an expensive material and process requiring rolling and trimming.

SUMMARY OF THE INVENTION

It has been found, according to the present invention, that a shatter-resistant mirror and method for same may be had by first subjecting a back side of a glass mirror to a preheating sequence, applying a first layer of a rubber adhesive composition, subjecting the first layer to heat treatment at a predetermined temperature, and then applying a second layer of the rubber adhesive composition over the first layer. Due to the heat treatment process and thickness of layers applied subsequently, moisture as would damage the mirror is effectively eliminated. A well adhered composite layer is produced devoid of moisture having a predetermined thickness which gives the mirror the required shatter resistance.

Accordingly, an important object of the present invention is to provide a shatter-resistant mirror article for use in buildings.

Yet another important object of the present invention is to provide a shatter-resistant mirror article which complies with current safety performance specifications.

Still another important object of the present invention is to provide a method for making an improved shatter-resistant mirror wherein a coating is applied to the back side by successive spraying steps to produce a well adhering composite layer to which broken particles cling when the mirror shatters.

Still another important object of the present invention is a method for making an improved shatter-resistant mirror wherein two layers of a rubber adhesive composition are sprayed to the back side in successive steps after heat treatment steps resulting in the drying of the mirror from the back side outwardly to release entrapped moisture and prevent defects on the face of the mirror.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a schematic illustration for apparatus for carrying out the method according to the invention.

FIG. 1a is an enlarged elevational view illustrating apparatus for carrying out the spraying step according to the invention.

FIG. 1b is an enlarged elevational view illustrating apparatus for carrying out the heat treatment steps according to the invention, and FIG. 2 is a sectional view taken along lines 2—2 of FIG. 1.

DESCRIPTION OF A PREFERRED EMBODIMENT

The invention relates to a shatter-resistant mirror article and method of making same wherein a glass mirror is supported with a back surface facing upwards and preheated by heat treatment at a desired temperature. A first layer of a rubber adhesive composition is then sprayed over the back surface. The first layer and back surface are then subjected to a heat treatment at a predetermined temperature and then a second layer of the rubber composition is sprayed over the first layer. A second layer of the rubber composition is applied over the first layer. A heat treatment causes the layers to be dried outwardly which effectively prevents moisture from being trapped against the back surface of the mirror.

Heating improves the application of the coating composition and adherence. The heat treatment steps and separate layer application and thickness effectively evaporate moisture and prevent its attack on the paint, silver, and copper coating solutions on the mirror back surface which would cause defects upon the face of the mirror appearing as specks.

The adherence of the first and second layers and the clinging of broken glass particles are enhanced to improve the shatter resistance of the mirror article. By shatter resistance, it is meant that the broken glass will cling and adhere to the backing layer and retained as a one-piece article should the mirror be shattered such as by a blow. It has been found that the necessary drying and desired shatter resistance of the mirror product are achieved by applying each of the first and second layers approximately two mils thick resulting in a total backing layer of four mils.

While any suitable rubber or rubber-like composition may be utilized for the backing layers such as a vinyl, neoprene or other polymer or monomer composition, a particularly suitable composition has been found to be a rubber adhesive composition manufactured by the 3-M Company as contact cement No. 2226.

As illustrated in FIG. 1, a suitable apparatus for carrying out the method is illustrated wherein a suitable conveyor of the multi-belt type is illustrated at 10 which is supported and driven by suitable driven rollers 12 and 14 in a conventional manner such as electric motor 12a connected to roller 12. Suitable idler rollers 13 are employed as required. A float glass mirror article 16 may be positioned on an entrance table 18 and fed to the conveyor 10 whereupon it is subjected to a first preheating treatment by means of an infra-red heater 20 which may be any suitable infra-red heater. Subsequently, the back surface 16a of the mirror is subjected to a spraying process by a laterally moving spray nozzle 22 driven by a chain belt 24 in a conventional manner so that the spray nozzle 22 reciprocates laterally from one end of the spray head support 26 to the other to completely transverse the width of the conveyor and the back surface of mirrors positioned on the conveyor as illustrated. A trap 28 is located between adjacent conveyor ends to catch residual spray avoiding contact with the belts and mirror fronts. A second infra-red heater 20 is positioned above the conveyor subjecting the back surface and first layer to a predetermined temperature. A second final layer is then sprayed over the first layer.

It has been found that a temperature of 200°-250°, preferably 225° fahrenheit, preheats the mirror back surface to produce the desired drying and evaporation of moisture from the layer from the back surface 16a of the mirror outwardly without blistering the mirror coating solution on the back side or scorching the rubber composition. The first layer adheres well to the back surface of the mirror and the subsequently applied layer also adheres well to the first layer whereby enhanced shatter resistance is provided. The second heat treatment heats the first layer and assures that moisture is effectively removed from the second coating layer preventing any subsequent seepage of moisture onto the mirror back surface.

It has been found that spraying the rubber composition provides an improved shatter resistant mirror over the previous rolled backing techniques. A suitable airless spray pump and nozzle system is manufactured by the Nordson Corporation of Amherst, Ohio, Model No. 100064.

The rubber adhesive composition is applied at approximately fifty percent (50%) solid content by volume to produce well adhering layers and shatter resistance. It has been found that such a composition may be applied by the spray system at pressures of less than about 600 p.s.i. without clabbering.

Referring to FIG. 2, it can be seen that a shatter resistant mirror article is illustrated in section as taken along lines 2—2 of FIG. 1 wherein a float glass mirror article 16 is provided by two layers 30 and 32 of the rubber adhesive composition. The coating provided by the two subsequently applied layers has a total thickness of approximately four mils. A total backing layer of approximately four mils provides the desired shatter resistance. However, to protect the paint, silver, and copper coating solutions and hence reduce defects, it has been found expedient to apply each layer as approximately a two mil layer, which thickness allows the desired drying and evaporation when applied upon a preheated surface or coating. Application and drying of a single four mil layer involves considerable risk of scorching and blistering without assurance that all moisture has been eliminated.

Thus, it can be seen that an advantageous construction can be had for an improved shatter resistant mirror article and method therefor wherein the clinging of shattered glass to the backing layer and mirror appearance are substantially improved.

While a preferred embodiment of the invention has been described using specific terms, such description is for illustrative purposes only, and it is to be understood that changes and variations may be made without departing from the spirit or scope of the following claims.

What is claimed is:

1. A method of producing a shatter-resistant mirror article comprising:
   supporting said mirror with a back surface facing up;
   preheating said back surface of said mirror by heat treatment at a pre-determined temperature which heats and evaporates any moisture on the back surface without blistering the mirror;
   spraying a first layer of a rubber composition over said preheated back surface;
   subjecting said first layer and back surface to heat treatment at a predetermined temperature which removes any moisture and preparatorily heats said first layer without scorching thereof;
   spraying a second layer of said rubber composition over said heated first layer, and
   said heat treatments and layer thicknesses being applied as to cause said layers to be dried outwardly away from said back surface;
   whereby moisture is effectively removed from said back surface and composition layers to reduce mirror defects and enhance the adherence of said first and second layers and the shatter resistance thereof.

2. The method of claim 1 wherein said first and secnd layers are each approximately two mils thick.

3. The method of claim 1 wherein said first and second layers have a total thickness of approximately four mils.

4. The method of claim 1 wherein said rubber composition includes fifty percent solid content by volume.

5. The method of claim 1 wherein said predetermined temperature is approximately 225 degrees fahrenheit.

6. The method of claim 1 including providing an airless pump spray system by which said first and second layers are sprayed.

7. The method of claim 6 wherein said spray system is operated at a pressure of less than about 600 psi.

* * * * *